US012804485B2

(12) United States Patent
Takahashi et al.

(10) Patent No.: US 12,804,485 B2
(45) Date of Patent: Nov. 17, 2026

(54) BASE STATION AND USER EQUIPMENT

(71) Applicants: DENSO CORPORATION, Kariya-city (JP); TOYOTA JIDOSHA KABUSHIKI KAISHA, Toyota (JP)

(72) Inventors: Hideaki Takahashi, Kariya-city (JP); Masayuki Hoshino, Kariya-city (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 498 days.

(21) Appl. No.: 18/314,690

(22) Filed: May 9, 2023

(65) Prior Publication Data

US 2023/0276319 A1 Aug. 31, 2023

Related U.S. Application Data

(63) Continuation of application No. PCT/JP2021/034909, filed on Sep. 22, 2021.

(30) Foreign Application Priority Data

Nov. 10, 2020 (JP) ................................ 2020-187344

(51) Int. Cl.
*H04W 36/00* (2009.01)
*H04W 36/24* (2009.01)

(52) U.S. Cl.
CPC ....... *H04W 36/0072* (2013.01); *H04W 36/24* (2013.01)

(58) Field of Classification Search
CPC ................................................ H04W 36/0072
See application file for complete search history.

(56) References Cited

U.S. PATENT DOCUMENTS

2012/0270552 A1 10/2012 Shi et al.
2019/0116536 A1 4/2019 Xu et al.
2020/0178148 A1* 6/2020 Lee ........................ H04L 5/001
(Continued)

FOREIGN PATENT DOCUMENTS

JP 2022076781 A 5/2022
JP 2022077435 A 5/2022
(Continued)

OTHER PUBLICATIONS

3GPP TSG-RAN WG2 Meeting #112-e, Electronic, Nov. 2-13, 2020, R2-2009934, Huawei, HiSilicon, “Identification and access restriction of RedCap UE”, pp. 1-5.
(Continued)

*Primary Examiner* — Jason E Mattis
(74) *Attorney, Agent, or Firm* — Harness, Dickey & Pierce, 1P.L.C.

(57) ABSTRACT

A base station according to an aspect of the present disclosure includes a memory storing a program, and one or more processors configured to execute the program to obtain a Radio Resource Control, RRC, Reconfiguration message for a handover, and transmit the RRC Reconfiguration message to a user equipment. The RRC Reconfiguration message includes first information for indicating a first Control Resource Set, CORESET, in a target cell, and second information for indicating a second CORESET for a Reduced Capability user equipment in the target cell.

5 Claims, 10 Drawing Sheets

(56) References Cited

U.S. PATENT DOCUMENTS

| | | | | |
|---|---|---|---|---|
| 2021/0377950 | A1 | 12/2021 | Takahashi et al. | |
| 2022/0030605 | A1* | 1/2022 | Hu | H04L 5/0023 |
| 2022/0394521 | A1* | 12/2022 | Zhou | H04W 24/08 |
| 2023/0156752 | A1* | 5/2023 | Tuong Tran | H04W 72/1273 370/329 |
| 2023/0180199 | A1* | 6/2023 | Jung | H04L 5/0053 370/329 |

FOREIGN PATENT DOCUMENTS

| | | | |
|---|---|---|---|
| WO | WO-2020/031588 | A1 | 2/2020 |
| WO | WO-2020/065862 | A1 | 4/2020 |

OTHER PUBLICATIONS

U.S. Appl. No. 18/314,715, filed May 9, 2023, Takahashi et al.

U.S. Appl. No. 18/314,731, filed May 9, 2023, Takahashi et al.

International Search Report regarding International Patent Application No. PCT/JP2021/034909, dated Dec. 28, 2021.

3GPP TSG RAN Meeting #89e, Electronic Meeting, Sep. 14-18, 2020, RP-201677, Ericsson, "Revised SID on Study on support of reduced capability NR devices".

3GPP TSG RAN WG1 #101, e-Meeting, May 25-Jun. 5, 2020, R1-2004421, NTT Docomo, Inc. "Potential UE complexity reduction features for RedCap".

3GPP TS 38.331 V16.2.0 (Sep. 2020) "3rd Generation Partnership Project; Technical Specification Group Radio Access Network; NR; Radio Resource Control (RRC) protocol specification (Release 16)".

* cited by examiner

FIG.6

| MIB | |
|---|---|
| systemFrameNumber | |
| subCarrierSpacingCommon | |
| ssb-SubcarrierOffset | |
| dmrs-TypeA-Position | |
| pdcch-ConfigSIB1 | controlResourceSetZero |
| | searchSpaceZero |
| cellBarred | |
| intraFreqReselection | |
| Mib-bisPresence-r17 | |

FIG.7

| MIB-bis | |
|---|---|
| pdcch-ConfigSIB1-RedCap-r17 | controlResourceSetZero |
| | searchSpaceZero |

| MIB | |
|---|---|
| systemFrameNumber | |
| subCarrierSpacingCommon | |
| ssb-SubcarrierOffset | |
| dmrs-TypeA-Position | |
| pdcch-ConfigSIB1 | controlResourceSetZero |
| | searchSpaceZero |
| cellBarred | |
| intraFreqReselection | |
| redCap-CORESET-Zero-RB-r17 | |

BASE STATION AND USER EQUIPMENT

CROSS-REFERENCE TO RELATED APPLICATIONS

This application is a continuation application of PCT/JP2021/034909, filed on Sep. 22, 2021, which application is based on and claims priority to Japanese Patent Application No. 2020-187344, filed on Nov. 10, 2020, the contents of which are incorporated herein by reference.

BACKGROUND

1. Technical Field

The present disclosure relates to a base station and a user equipment.

2. Related Art

Mobile communication technologies have been proposed and standardized as Technical Specifications (TSs) in 3rd Generation Partnership Project (3GPP). Currently in particular, 5th Generation (5G) technologies have been proposed and standardized.

SUMMARY

A base station according to an aspect of the present disclosure includes a memory storing a program, and one or more processors configured to execute the program to obtain a Radio Resource Control, RRC, Reconfiguration message for a handover, and transmit the RRC Reconfiguration message to a user equipment. The RRC Reconfiguration message includes first information for indicating a first Control Resource Set, CORESET, in a target cell, and second information for indicating a second CORESET for a Reduced Capability user equipment in the target cell.

A user equipment according to an aspect of the present disclosure includes a memory storing a program, and one or more processors configured to execute the program to receive, from a base station, a Radio Resource Control, RRC, Reconfiguration message for a handover, the RRC Reconfiguration message including first information for indicating a first Control Resource Set, CORESET, in a target cell, and second information for indicating a second CORESET for a Reduced Capability user equipment in the target cell, and use the first information or the second information.

BRIEF DESCRIPTION OF THE DRAWINGS

FIG. 6 is an explanatory diagram for explaining an example of a MIB according to a first embodiment.

FIG. 7 is an explanatory diagram for explaining an example of an additional MIB according to the first embodiment.

DETAILED DESCRIPTION OF THE PREFERRED EMBODIMENTS

Figure 1:
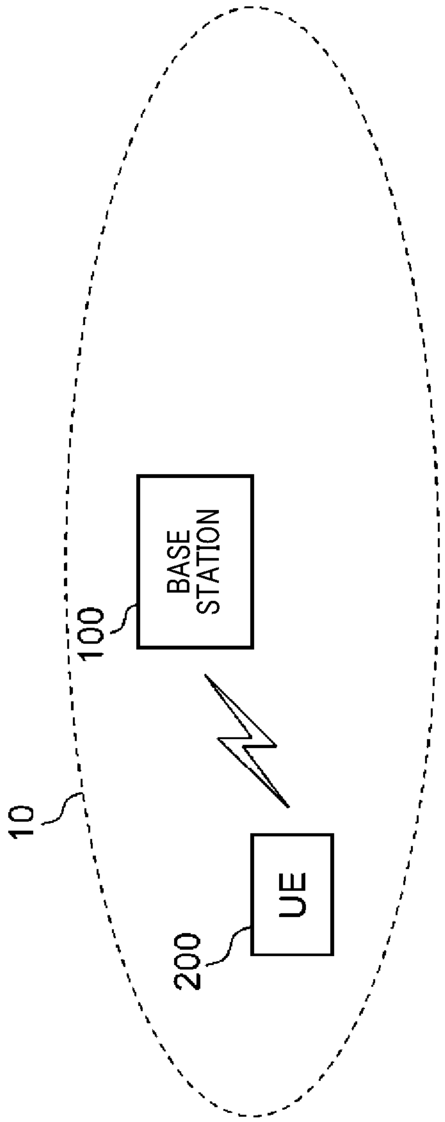
FIG. 1 is an explanatory diagram illustrating an example of a schematic configuration of a system according to embodiments of the present disclosure.

For example, as described in 3GPP TS 38.331 V16.2.0 (2020-09), a base station broadcasts System Information, and User Equipments (UEs) receive the System Information. The System Information includes a Master Information Block (MIB), a System Information Block 1 (SIB1), and other SIBs.

Further, as described in RP-201677, UEs with reduced capabilities are being studied. For example, study on UE complexity reduction such as reduction in the number of antennas and reduction in bandwidth has begun.

According to the technology disclosed in 3GPP TS 38.331 V16.2.0 (2020-09), the MIB includes controlResourceSetZero that determines a Control Resource Set (CORESET) #0. In particular, this controlResourceSetZero determines a bandwidth of a CORESET #0. However, a detailed study by the inventors has revealed an issue that, since controlResourceSetZero is common information for all UEs, the bandwidth of the CORESET #0 will be unsuitable for a UE that supports a narrow bandwidth as described in RP-201677.

An object of the present disclosure is to provide a base station and a user equipment that make it possible to use a control resource set with a bandwidth suitable for a user equipment. A base station according to an aspect of the present disclosure includes an information obtaining unit configured to obtain a Master Information Block, MIB, and a communication processing unit configured to transmit the MIB. The MIB includes 1-bit information regarding a bandwidth of a Control Resource Set, CORESET, for a user equipment with a limited bandwidth capability.

A user equipment according to an aspect of the present disclosure includes a communication processing unit configured to receive a Master Information Block, MIB, that includes 1-bit information regarding a bandwidth of a Control Resource Set, CORESET, for a user equipment with a limited bandwidth capability, and an information obtaining unit configured to obtain the 1-bit information included in the MIB.

A base station according to an aspect of the present disclosure includes an information obtaining unit configured to obtain a Radio Resource Control, RRC, Reconfiguration message for a handover of a user equipment from a source cell to a target cell, and a communication processing unit configured to transmit the RRC Reconfiguration message to the user equipment. The RRC Reconfiguration message includes first Control Resource Set, CORESET, information regarding a first CORESET in the target cell, and second CORESET information regarding a second CORESET for a user equipment with a limited bandwidth capability in the target cell.

A user equipment according to an aspect of the present disclosure includes a communication processing unit configured to receive, from a base station, an RRC Reconfiguration message for a handover of the user equipment from a source cell to a target cell, the RRC Reconfiguration message including first Control Resource Set, CORESET, information regarding a first CORESET in the target cell, and second CORESET information regarding a second CORESET for a user equipment with a limited bandwidth capability in the target cell, and an information obtaining unit configured to obtain the first CORESET information or the second CORESET information.

The present disclosure makes it possible to use a control resource set with a bandwidth suitable for a user equipment. Note that, instead of or in addition to this advantageous effect, the present disclosure may yield another advantageous effect.

Hereinafter, embodiments of the present disclosure will be described in detail with reference to the appended drawings. In the present specification and the drawings, elements to which similar descriptions are applicable are denoted with the same reference signs, thereby omitting duplicate descriptions.

Descriptions will be given in the following order:

1. Configuration of System
2. Configuration of Base Station
3. Configuration of User Equipment
4. First Embodiment
   4. 1. Operation Examples
   4.2. Modification Examples
5. Second Embodiment
   5. 1. Operation Examples
   5.2. Modification Examples
6. Modification Examples

1. Configuration of System

A configuration example of a system 1 according to embodiments of the present disclosure will be described with reference to FIG. 1. Referring to FIG. 1, the system 1 includes a base station 100 and a user equipment (UE) 200.

For example, the system 1 is a system compliant with Technical Specifications (TSs) of 3GPP. More specifically, for example, the system 1 is a system compliant with 5G or New Radio (NR) TSs. Naturally, the system 1 is not limited to this example.

(1) Base Station 100

The base station 100 is a node in a Radio Access Network (RAN) and communicates with a UE (for example, UE 200) located within a coverage area 10 of the base station 100.

For example, the base station 100 communicates with a UE (for example, UE 200) using a RAN protocol stack. For example, the protocol stack includes a Radio Resource Control (RRC) layer, a Service Data Adaptation Protocol (SDAP) layer, a Packet Data Convergence Protocol (PDCP) layer, a Radio Link Control (RLC) layer, a Medium Access Control (MAC) layer, and a Physical (PHY) layer. Alternatively, the protocol stack may include some, but not all, of these layers.

For example, the base station 100 is a gNB. The gNB is a node that provides NR user plane and control plane protocol terminations towards a UE and is connected to the 5G Core Network (5GC) via an NG interface. Alternatively, the base station 100 may be an en-gNB.

The base station 100 may include a plurality of nodes. The plurality of nodes may include a first node that hosts higher layers included in the protocol stack, and a second node that hosts lower layers included in the protocol stack. The higher layers may include the RRC layer, the SDAP layer, and the PDCP layer, while the lower layers may include the RLC layer, the MAC layer, and the PHY layer. The first node may be a Central Unit (CU), and the second node may be a Distributed Unit (DU). Note that the plurality of nodes may include a third node that performs lower processing of the PHY layer, and the second node may perform higher processing of the PHY layer. The third node may be a Radio Unit (RU).

Alternatively, the base station 100 may be one of the plurality of nodes, and may be connected to another unit of the plurality of nodes.

The base station 100 may be an Integrated Access and Backhaul (IAB) donor or an IAB node.

(2) UE 200

The UE 200 communicates with a base station. For example, the UE 200 communicates with the base station 100 when being located within the coverage area 10 of the base station 100.

For example, the UE 200 communicates with a base station (for example, base station 100) using the protocol stack.

2. Configuration of Base Station

Figure 2:
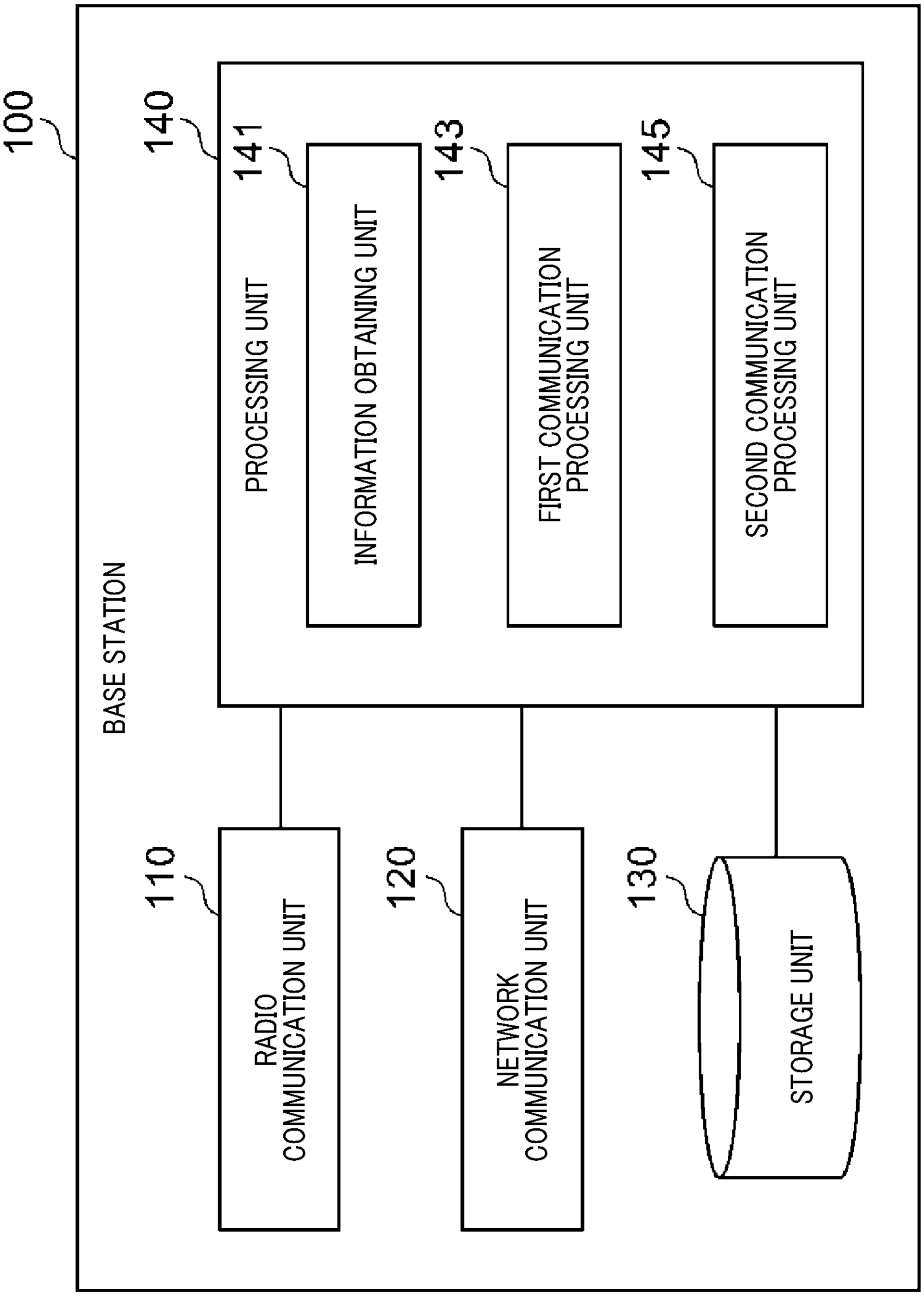
FIG. 2 is a block diagram illustrating an example of a schematic functional configuration of a base station according to embodiments of the present disclosure.
Figure 3:
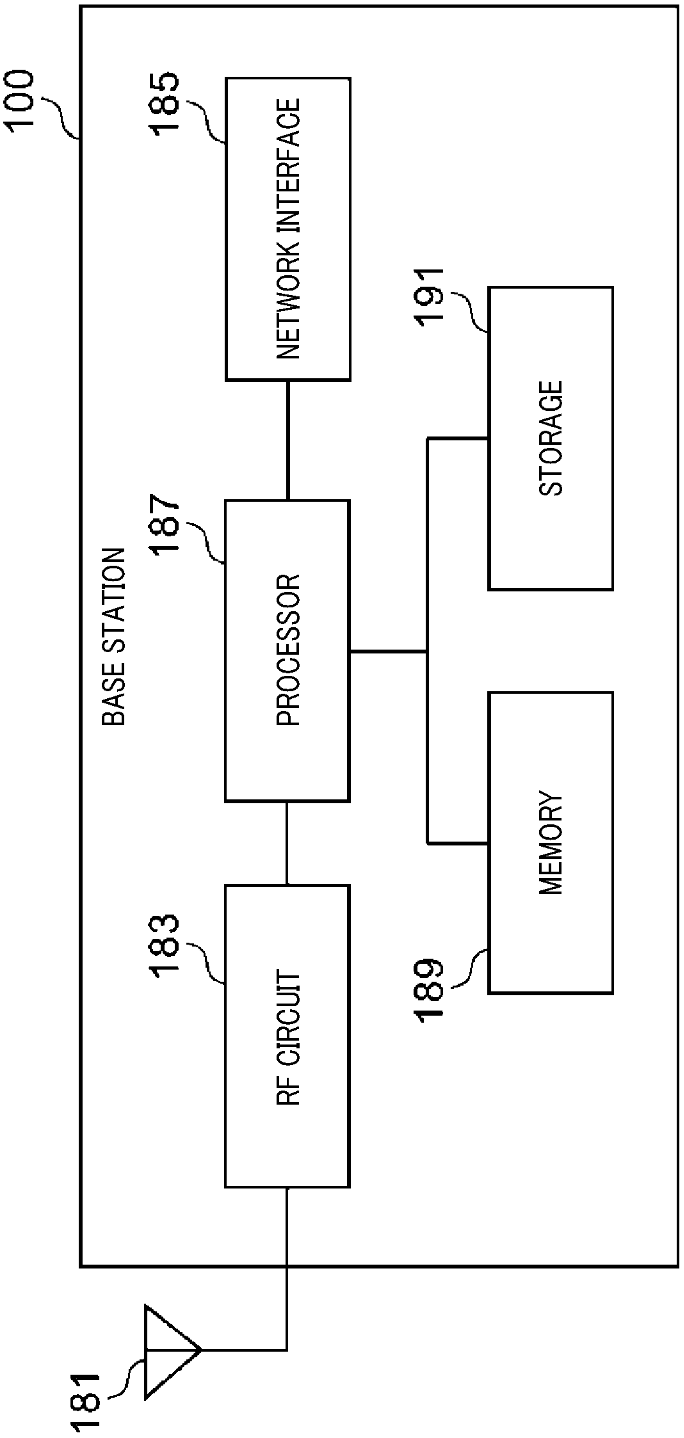
FIG. 3 is a block diagram illustrating an example of a schematic hardware configuration of the base station according to embodiments of the present disclosure.

A configuration example of the base station 100 according to embodiments of the present disclosure will be described with reference to FIGS. 2 and 3.

(1) Functional Configuration

First, a functional configuration example of the base station 100 according to embodiments of the present disclosure will be described with reference to FIG. 2. Referring to FIG. 2, the base station 100 includes a radio communication unit 110, a network communication unit 120, a storage unit 130, and a processing unit 140.

The radio communication unit 110 wirelessly transmits and receives signals. For example, the radio communication unit 110 receives signals from and transmits signals to a UE.

The network communication unit 120 receives signals from and transmits signals to the network.

The storage unit 130 stores various information.

The processing unit 140 provides various functions of the base station 100. The processing unit 140 includes an information obtaining unit 141, a first communication processing unit 143, and a second communication processing unit 145. Note that the processing unit 140 may further include a component other than these components. That is, the processing unit 140 may also perform an operation other than operations of these components. Specific operations of the information obtaining unit 141, the first communication processing unit 143 and the second communication processing unit 145 will be described in detail later.

For example, the processing unit 140 (first communication processing unit 143) communicates with a UE (for example, UE 200) via the radio communication unit 110. For example, the processing unit 140 (second communication processing unit 145) communicates with other nodes (for example, nodes within the core network or other base stations) via the network communication unit 120.

(2) Hardware Configuration

Next, a hardware configuration example of the base station 100 according to embodiments of the present disclosure will be described with reference to FIG. 3. Referring to FIG. 3, the base station 100 includes an antenna 181, an RF circuit 183, a network interface 185, a processor 187, a memory 189, and a storage 191.

The antenna 181 converts signals into radio waves, and emits the radio waves into the air. In addition, the antenna 181 receives radio waves in the air, and converts the radio waves into signals. The antenna 181 may include a transmitting antenna and a receiving antenna, or may be a single antenna for transmission and reception. The antenna 181 may be a directional antenna, and may include a plurality of antenna elements.

The RF circuit 183 performs analog processing on signals that are transmitted and received through the antenna 181. The RF circuit 183 may include a high-frequency filter, an amplifier, a modulator, a lowpass filter, and the like.

The network interface 185 is, for example, a network adaptor, and transmits signals to and receives signals from the network.

The processor 187 performs digital processing on signals that are transmitted and received through the antenna 181 and the RF circuit 183. The digital processing includes processing of the RAN protocol stack. The processor 187 also performs processing on signals that are transmitted and received through the network interface 185. The processor 187 may include a plurality of processors, or may be a single processor. The plurality of processors may include a baseband processor that performs the digital processing and one or more processors that perform other processing.

The memory 189 stores a program executed by the processor 187, parameters related to the program, and data related to the program. The memory 189 may include at least one of a Read Only Memory (ROM), an Erasable Programmable Read Only Memory (EPROM), an Electrically Erasable Programmable Read Only Memory (EEPROM), a Random Access Memory (RAM), and a flash memory. All or part of the memory 189 may be included in the processor 187.

The storage 191 stores various information. The storage 191 may include at least one of a Solid State Drive (SSD) and a Hard Disc Drive (HDD).

The radio communication unit 110 may be implemented by the antenna 181 and the RF circuit 183. The network communication unit 120 may be implemented by the network interface 185. The storage unit 130 may be implemented by the storage 191. The processing unit 140 may be implemented by the processor 187 and the memory 189.

A part or all of the processing unit 140 may be virtualized. In other words, a part or all of the processing unit 140 may be implemented as a virtual machine. In this case, a part or all of the processing unit 140 may operate as a virtual machine on a physical machine including a processor, a memory, and the like (that is, hardware) and a hypervisor.

Given the hardware configuration described above, the base station 100 may include a memory (that is, memory 189) that stores a program and one or more processors (that is, processor 187) capable of executing the program, and the one or more processors may be configured to execute the program to perform operations of the processing unit 140. The program may be a program for causing the processors to execute the operations of the processing unit 140.

3. Configuration of User Equipment

Figure 4:
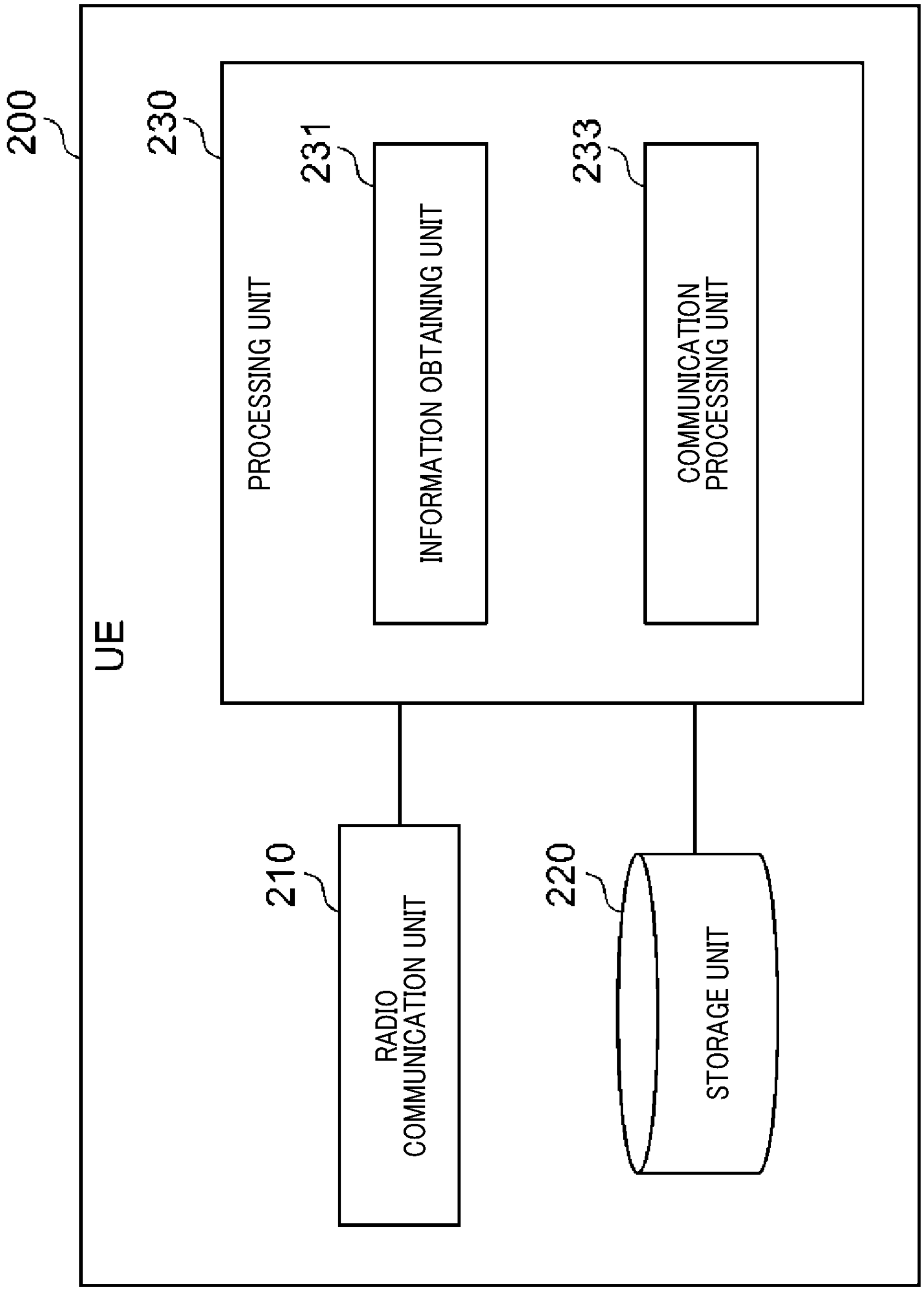
FIG. 4 is a block diagram illustrating an example of a schematic functional configuration of a user equipment according to embodiments of the present disclosure.
Figure 5:
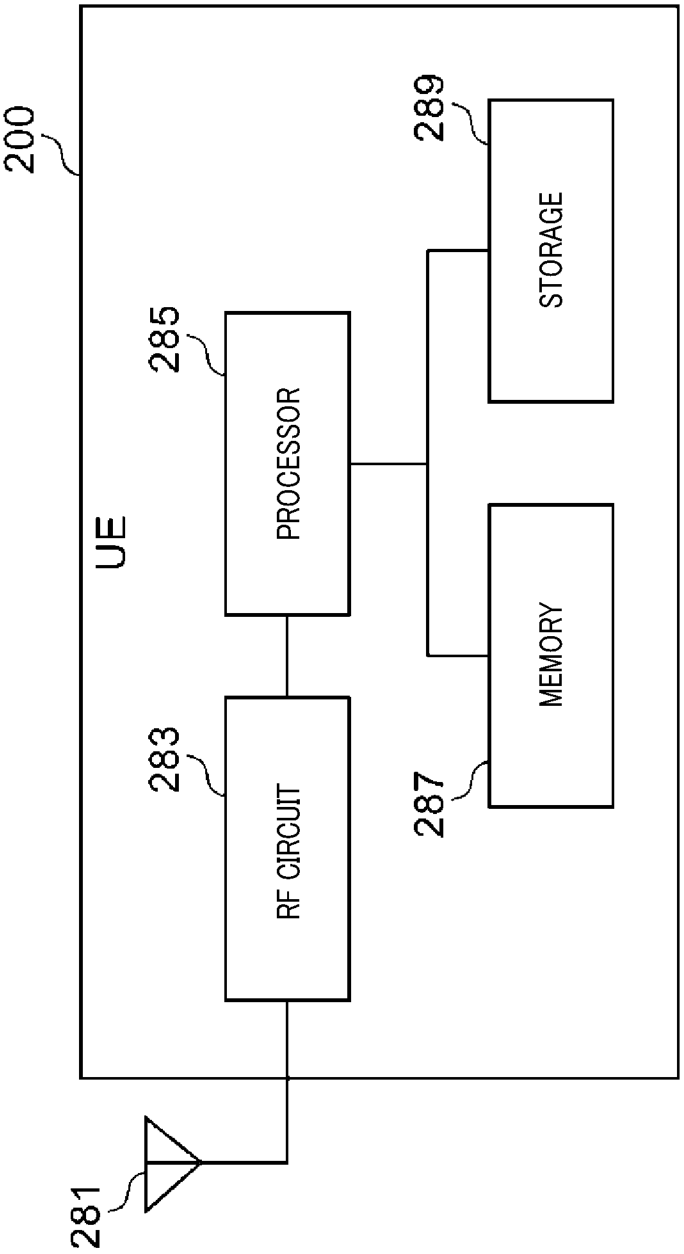
FIG. 5 is a block diagram illustrating an example of a schematic hardware configuration of the user equipment according to embodiments of the present disclosure.

A configuration example of the UE 200 according to embodiments of the present disclosure will be described with reference to FIGS. 4 and 5.

(1) Functional Configuration

First, a functional configuration example of the UE 200 according to embodiments of the present disclosure will be described with reference to FIG. 4. Referring to FIG. 4, the UE 200 includes a radio communication unit 210, a storage unit 220, and a processing unit 230.

The radio communication unit 210 wirelessly transmits and receives signals. For example, the radio communication unit 210 receives signals from and transmits signals to a base station. For example, the radio communication unit 210 receives signals from and transmits signals to another UE.

The storage unit 220 stores various information.

The processing unit 230 provides various functions of the UE 200. The processing unit 230 includes an information obtaining unit 231 and a communication processing unit 233. Note that the processing unit 230 may further include a component other than these components. That is, the processing unit 230 may also perform an operation other than operations of these components. Specific operations of the information obtaining unit 231 and the communication processing unit 233 will be described in detail later.

For example, the processing unit 230 (communication processing unit 233) communicates with a base station (for example, base station 100) or another UE via the radio communication unit 210.

(2) Hardware Configuration

Next, a hardware configuration example of the UE 200 according to embodiments of the present disclosure will be described with reference to FIG. 5. Referring to FIG. 5, the UE 200 includes an antenna 281, an RF circuit 283, a processor 285, a memory 287, and a storage 289.

The antenna 281 converts signals into radio waves, and emits the radio waves into the air. In addition, the antenna 281 receives radio waves in the air, and converts the radio waves into signals. The antenna 281 may include a transmitting antenna and a receiving antenna, or may be a single antenna for transmission and reception. The antenna 281 may be a directional antenna, and may include a plurality of antenna elements.

The RF circuit 283 performs analog processing on signals that are transmitted and received through the antenna 281. The RF circuit 283 may include a high-frequency filter, an amplifier, a modulator, a lowpass filter, and the like.

The processor 285 performs digital processing on signals that are transmitted and received through the antenna 281 and the RF circuit 283. The digital processing includes processing of the RAN protocol stack. The processor 285 may include a plurality of processors, or may be a single processor. The plurality of processors may include a baseband processor that performs the digital processing and one or more processors that perform other processing.

The memory 287 stores a program executed by the processor 285, parameters related to the program, and data related to the program. The memory 287 may include at least one of a ROM, an EPROM, an EEPROM, a RAM, and a flash memory. All or part of the memory 287 may be included in the processor 285.

The storage 289 stores various information. The storage 289 may include at least one of an SSD and an HDD.

The radio communication unit 210 may be implemented by the antenna 281 and the RF circuit 283. The storage unit 220 may be implemented by the storage 289. The processing unit 230 may be implemented by the processor 285 and the memory 287.

The processing unit 230 may be implemented by a System on Chip (SoC) including the processor 285 and the memory 287. The SoC may include the RF circuit 283, and the radio communication unit 210 may also be implemented by this SoC.

Given the hardware configuration described above, the UE 200 may include a memory (that is, memory 287) that stores a program and one or more processors (that is, processor 285) capable of executing the program, and the one or more processors may be configured to execute the program to perform operations of the processing unit 230. The program may be a program for causing the processors to execute the operations of the processing unit 230.

4. First Embodiment

A first embodiment of the present disclosure will be described with reference to FIGS. 6 to 10.

4. 1. Operation Examples

Operation examples of the base station 100 and the UE 200 according to the first embodiment will be described with reference to FIGS. 6 to 8.

The base station 100 (information obtaining unit 141) obtains a Master Information Block (MIB). The base station 100 (first communication processing unit 143) transmits the MIB. In the first embodiment in particular, the MIB includes 1-bit information regarding a bandwidth of a Control Resource Set (CORESET) for a UE with a limited bandwidth capability.

The UE 200 (communication processing unit 233) receives the MIB. The UE 200 (information obtaining unit 231) obtains the 1-bit information included in the MIB.

This, for example, enables the UE 200 to use a CORESET with a bandwidth suitable for the UE 200. More specifically, for example, in a case where the UE 200 is a UE with a limited bandwidth capability, the UE 200 can use a CORESET for such a UE.

(1) UE with Limited Bandwidth Capability

The UE with a limited bandwidth capability has a narrower maximum bandwidth than a normal UE. For example, the narrower maximum bandwidth is narrower than 96 Resource Blocks (RBs). The narrower maximum bandwidth may be narrower than 48 RBs. The narrower maximum bandwidth may be narrower than 24 RBs.

The limited bandwidth capability may be referred to as a reduced bandwidth capability or a narrow bandwidth capability.

Note that the UE with a limited bandwidth capability may have one or more other limited capabilities and may be simply referred to as a UE with a limited capability (or a reduced capability) or a Reduced Capability (RedCap) UE. For example, the one or more other limited capabilities may include a limited capability for the number of antennas, and the UE with a limited capability may have fewer antennas than a normal UE. The one or more other limited capabilities may include a limited duplex capability, and the UE with a limited capability may be capable of communicating only in half-duplex. The half-duplex may be Frequency Division Duplex (FDD) half-duplex (half-duplex-FDD).

The UE with a limited bandwidth capability may have a relaxed capability. For example, the relaxed capability may include a relaxed processing capability, and the UE with a limited bandwidth capability may have lower processing performance than a normal UE.

(2) CORESET

For example, the CORESET is a CORESET for a Type 0 Physical Downlink Control Channel (PDCCH) Common Search Space (CSS) set. In other words, the CORESET is a CORESET #0. In the CORESET, a PDCCH for a SIB1 is located.

This, for example, enables the UE 200 to use a CORESET #0 with a bandwidth suitable for the UE 200 to receive a PDCCH for a SIB1 and receive the SIB1.

(3) 1-Bit Information

For example, the 1-bit information is information indicating whether an additional MIB including CORESET information indicative of the bandwidth of the CORESET is transmitted.

For example, in a case where the additional MIB is transmitted, the value of the 1-bit information is 1, and the 1-bit information indicates that the additional MIB is transmitted. In a case where the additional MIB is not transmitted, the value of the 1-bit information is 0, and the 1-bit information indicates that the additional MIB is not transmitted.

Alternatively, in a case where the additional MIB is transmitted, the value of the 1-bit information may be 0, and the 1-bit information may indicate that the additional MIB is transmitted. In a case where the additional MIB is not transmitted, the value of the 1-bit information may be 1, and the 1-bit information may indicate that the additional MIB is not transmitted.

Referring to the example of FIG. 6, the MIB includes Mib-bisPresence-r17 that is the 1-bit information indicating whether the additional MIB is transmitted. In this way, one spare bit included in a MIB is replaced with the 1-bit information (that is, Mib-bisPresence-r17), and thus a payload size of the MIB remains 23 bits. Therefore, backward compatibility of a MIB is maintained.

(4) Additional MIB

For example, the additional MIB is a MIB for a UE with a limited bandwidth capability. The additional MIB may be referred to as a MIB-bis. Naturally, the additional MIB may be referred to by another name.

Transmission and Reception

For example, the base station 100 (information obtaining unit 141) obtains the additional MIB including the CORESET information. The base station 100 (first communication processing unit 143) transmits the additional MIB.

The UE 200 (information obtaining unit 231) obtains the 1-bit information included in the MIB. Then, for example, in a case where the UE 200 is a UE with a limited bandwidth capability and the 1-bit information included in the MIB indicates that the additional MIB is transmitted, the UE 200 (communication processing unit 233) receives the additional MIB. The UE 200 (information obtaining unit 231) obtains the CORESET information included in the additional MIB.

Transmission of the additional MIB makes it possible to, for example, transmit much information (for example, various combinations of parameters of a CORESET #0) while maintaining backward compatibility of a MIB.

Transmitting and Receiving Channel

For example, the base station 100 (first communication processing unit 143) transmits the MIB on a Physical Broadcast Channel (PBCH) and transmits the additional MIB on a further physical channel. This, for example, enables the PBCH to be maintained. As an example, the further physical channel is an additional PBCH. The additional PBCH may be referred to as a PBCH-bis.

For example, the further physical channel is located in a frequency resource determined depending on a frequency resource in which the PBCH is located. This, for example, enables the UE 200 to receive the additional MIB without receiving information regarding the further physical channel.

More specifically, for example, the further physical channel is located in one or more predetermined RBs among a plurality of RBs (for example, 20 RBs) in which the PBCH is located. As an example, the further physical channel may be located in the plurality of RBs (for example, 20 RBs) in which the PBCH is located. As another example, the further physical channel may be located in a predetermined number of RB s in the middle of the plurality of RBs (for example, 20 RBs) in which the PBCH is located. This, for example, enables the UE 200 to easily receive the additional MIB.

For example, the further physical channel is located in one or more symbols different from symbols in which the PBCH is located.

Content

Referring to the example of FIG. 7, the additional MIB is a MIB-bis and includes pdcch-ConfigSIB1-RedCap-r17. This pdcch-ConfigSIB1-RedCap-r17 includes the same information elements (IEs) as those in pdcch-ConfigSIB1 included in a MIB, specifically controlResourceSetZero and searchSpaceZero. This controlResourceSetZero indicates a bandwidth (for example, the number of RBs) of a CORESET for a UE with a limited bandwidth capability. The controlResourceSetZero further indicates at least one of a multiplexing pattern, the number of symbols, and an RB offset of the CORESET in addition to the bandwidth of the CORESET. For example, 16 combinations of a multiplexing pattern, the number of RBs, the 5 number of symbols, and an RB offset of the CORESET are predetermined, and the controlResourceSetZero indicates one of the 16 combinations.

(5) CORESET Information

Content of CORSET Information in Additional MIB

As described above, the CORESET information included in the additional MIB indicates a bandwidth of a CORESET for a UE with a limited bandwidth capability. In other words, the CORESET information determines a bandwidth of such a CORESET.

For example, the CORESET information indicates one of two or more predetermined bandwidths as the bandwidth of the CORESET.

For example, the two or more predetermined bandwidths include a predetermined bandwidth narrower than 24 RBs. This, for example, enables a UE with a limited bandwidth capability to use a CORESET even in a case where the UE is only capable of communicating over a bandwidth narrower than 24 RBs.

The two or more predetermined bandwidths may include only predetermined bandwidths narrower than 24 RBs. Alternatively, the two or more predetermined bandwidths may include at least one predetermined bandwidth narrower than 24 RBs and at least one predetermined bandwidth equal to or wider than 24 RBs.

Note that the two or more predetermined bandwidths are not limited to the above examples. The two or more predetermined bandwidths may include no predetermined bandwidths narrower than 24 RBs. Even in this case, a normal UE and a UE with a limited bandwidth capability can use CORESET #0 different from each other.

Content of Further CORSET Information in MIB

The MIB further includes 4-bit information regarding a further CORESET. The further CORESET is a CORESET for a normal UE, and the 4-bit information is, for example, controlResourceSetZero described in FIG. 6. The 4-bit information indicates 24 RBs, 48 RBs, or 96 RBs as a bandwidth of the further CORESET.

This, for example, enables a normal UE and a UE with a limited bandwidth capability to use CORESET #0 different from each other.

Operations Based on CORESET Information

As described above, for example, the UE 200 (information obtaining unit 231) obtains the CORESET information included in the additional MIB. In this case, for example, the UE 200 (communication processing unit 233) identifies the CORESET for a UE with a limited bandwidth capability on the basis of the CORESET information, and receives a PDCCH for a SIB1 using the CORESET. The UE 200 (communication processing unit 233) receives the SIB1 on the basis of Downlink Control Information (DCI) transmitted on the PDCCH.

(6) Process Flow

An example of processing according to the first embodiment will be described with reference to FIG. 8.

The base station 100 obtains a MIB including 1-bit information indicating whether a MIB-bis is transmitted, and transmits the MIB (S310). The UE 200 receives the MIB and obtains the 1-bit information.

The base station 100 obtains a MIB-bis and transmits the MIB-bis (S320). The MIB-bis includes CORESET information indicating a bandwidth of a CORESET for a UE with a limited bandwidth capability. The UE 200 receives the MIB-bis on the basis of the 1-bit information and obtains the CORESET information.

The base station 100 obtains a SIB1 and transmits the SIB1 (S330). The UE 200 receives the SIB1 on the basis of the CORESET information.

4.2. Modification Examples

In the above-described example of the first embodiment, the 1-bit information included in the MIB is information indicating whether an additional MIB including CORESET information indicative of the bandwidth of the CORESET is transmitted. However, the 1-bit information according to the first embodiment is not limited to this example.

Figure 10:
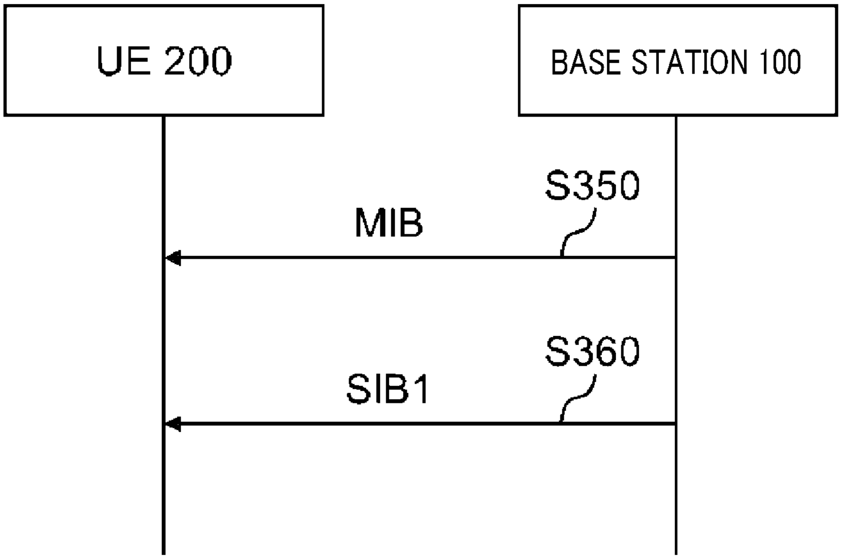
FIG. 10 is a sequence diagram for explaining an example of a schematic flow of processing according to the modification example of the first embodiment.

Modification examples according to the first embodiment will be described below with reference to FIGS. 9 and 10.

(1) 1-Bit Information

1-Bit Information=CORESET Information

In a modification example of the first embodiment, the 1-bit information included in the MIB may be CORESET information indicative of the bandwidth of the CORESET. This enables the UE 200 to use a CORESET with a bandwidth suitable for the UE 200 while maintaining backward compatibility of a MIB and without adding new information outside a MIB.

Figures 8, 9:
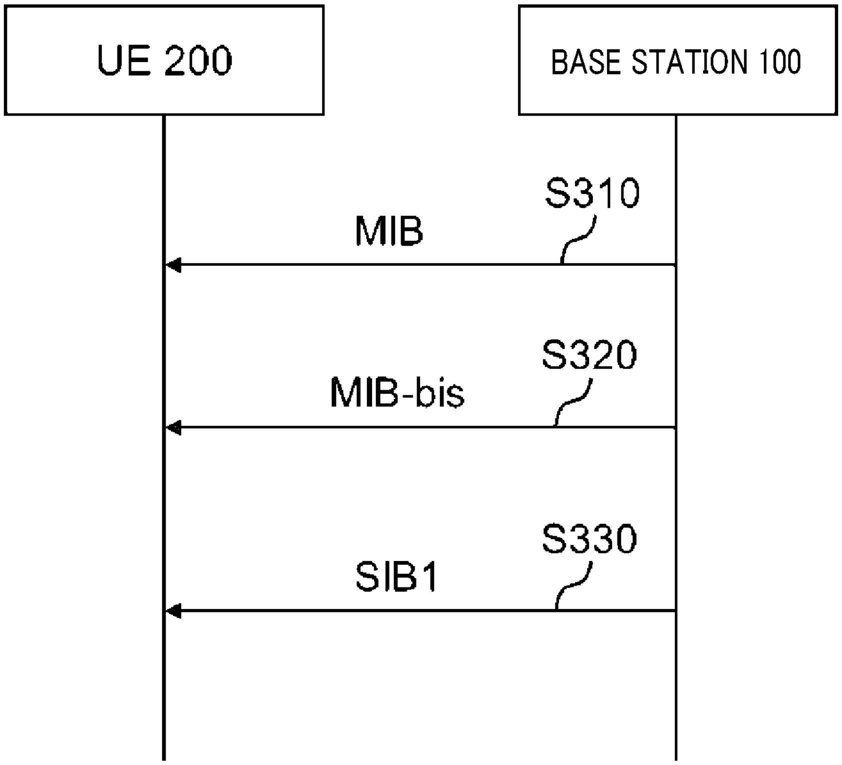
FIG. 8 is a sequence diagram for explaining an example of a schematic flow of processing according to the first embodiment.
FIG. 9 is an explanatory diagram for explaining an example of a MIB according to a modification example of the first embodiment.

Referring to the example of FIG. 9, the MIB may include redCap-CORESET-Zero-RB-r17 that is the 1-bit information indicating a bandwidth of a CORESET for a UE with a limited bandwidth capability. In this way, one spare bit included in a MIB is replaced with the 1-bit information (that is, redCap-CORESET-Zero-RB-r17), and thus a payload size of the MIB remains 23 bits. Therefore, backward compatibility of a MIB is maintained.

The CORESET information (that is, the 1-bit information) may indicate one of two predetermined bandwidths as the bandwidth of the CORESET.

The two predetermined bandwidths may include a predetermined bandwidth narrower than 24 RBs. This, for example, enables, a UE with a limited bandwidth capability to use a CORESET even in a case where the UE is only capable of communicating over a bandwidth narrower than 24 RBs.

The two predetermined bandwidths may include only predetermined bandwidths narrower than 24 RBs. As an example, the two predetermined bandwidths may include 5 RBs and 10 RBs. In this case, in a case where a value of the 1-bit information is 0, the 1-bit information may indicate 5 RBs, and in a case where a value of the 1-bit information is 1, the 1-bit information may indicate 10 RBs.

Alternatively, the two predetermined bandwidths may include a predetermined bandwidth narrower than 24 RBs and a predetermined bandwidth equal to or wider than 24 RBs.

Note that the two bandwidths are not limited to the above examples. The two predetermined bandwidths may include no predetermined bandwidths narrower than 24 RBs. Even in this case, a normal UE and a UE with a limited bandwidth capability can use CORESET #0 different from each other.

Note that the 1-bit information may further indicate at least one of a multiplexing pattern, the number of symbols and an RB offset of the CORESET in addition to the bandwidth of the CORESET. This enables, for example, use of parameters suitable for the UE 200. Alternatively, the 1-bit information may indicate only the bandwidth of the CORESET. In this case, a multiplexing pattern, the number of symbols and an RB offset indicated by further CORESET information included in the MIB (for example, controlResourceSetZero described in FIG. 9) may be used as parameters of the CORESET.

Operations Based on 1-Bit Information

The UE 200 (information obtaining unit 231) may obtain the 1-bit information included in the MIB. Then, in a case where the UE 200 is a UE with a limited bandwidth capability, the UE 200 (communication processing unit 233) may identify the CORESET for a UE with a limited bandwidth capability on the basis of the 1-bit information, and receive a PDCCH for a SIB1 using the CORESET. The UE 200 (communication processing unit 233) may receive the SIB1 on the basis of DCI transmitted on the PDCCH.

(2) Process Flow

An example of processing according to the modification example of the first embodiment will be described with reference to FIG. 10.

The base station 100 obtains a MIB and transmits the MIB (S350). The MIB includes 1-bit information indicating a bandwidth of a CORESET for a UE with a limited bandwidth capability. The UE 200 receives the MIB and obtains the 1-bit information.

The base station 100 obtains a SIB1 and transmits the SIB1 (S360). The UE 200 receives the SIB1 on the basis of the 1-bit information.

5. Second Embodiment

A second embodiment of the present disclosure will be described with reference to FIGS. 11 and 12.

5.1. Operation Examples

Operation examples of a base station 100 and a UE 200 according to the second embodiment will be described with reference to FIGS. 11 and 12.

The base station 100 (information obtaining unit 141) obtains an RRC Reconfiguration message for a handover of the UE 200 from a source cell to a target cell. The base station 100 (first communication processing unit 143) transmits the RRC Reconfiguration message to the UE 200. In the second embodiment in particular, the RRC Reconfiguration message includes first CORESET information regarding a first CORESET in the target cell, and second CORESET information regarding a second CORESET for a UE with a limited bandwidth capability in the target cell.

The UE 200 (communication processing unit 233) receives the RRC Reconfiguration message from the base station 100. The UE 200 (information obtaining unit 231) obtains the first CORESET information or the second CORESET information.

This, for example, enables the UE 200 to use a CORESET with a bandwidth suitable for the UE 200 in a target cell. More specifically, for example, in a case where the UE 200 is a UE with a limited bandwidth capability, the UE 200 can use a CORESET for such a UE in a target cell.

(1) Handover

For example, the handover is a handover between two base stations 100. Herein, a base station 100 of the source cell (that is, source base station) is represented as a base station 100A, and a base station 100 of the target cell (that is, target base station) is represented as a base station 100B. The handover may be referred to as an Xn based Handover, or may be referred to as an NG based Handover.

Figure 11:
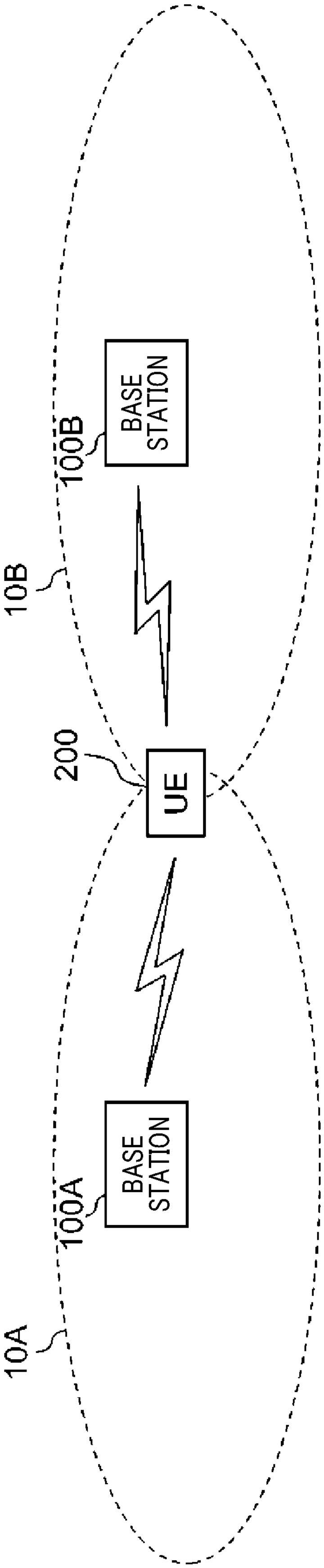
FIG. 11 is an explanatory diagram for explaining an example of a handover according to a second embodiment.
Figure 12:
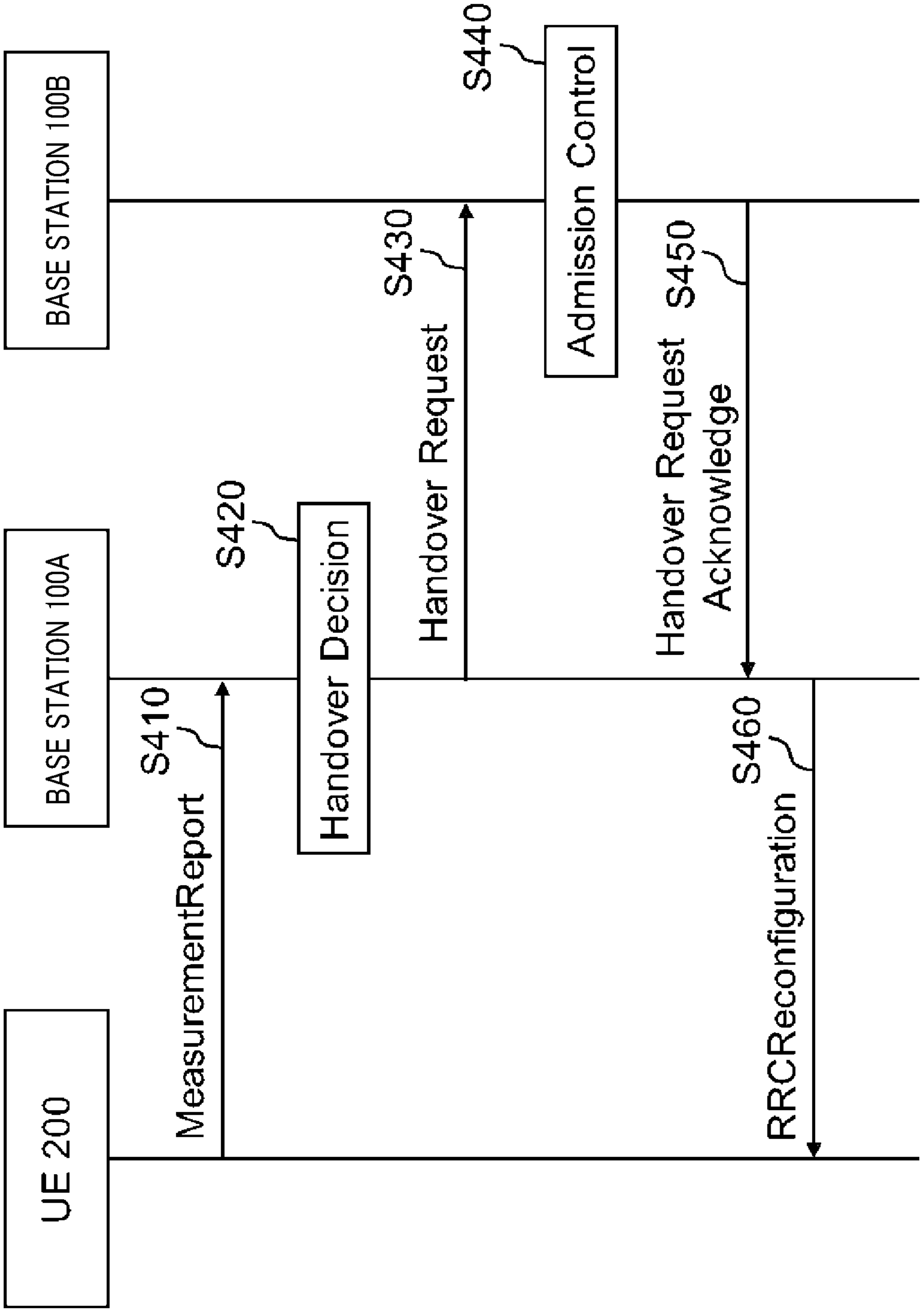
FIG. 12 is a sequence diagram for explaining an example of a schematic flow of a part of a handover process according to the second embodiment.

Referring to the example of FIG. 11, the UE 200 moves from a coverage area 10A of the base station 100A to a coverage area 10B of the base station 100B. This causes a handover of the UE 200 from a source cell (that is, coverage area 10A) of the base station 100A to a target cell (that is, coverage area 10B) of the base station 100B. In this case, the base station 100A transmits the RRC Reconfiguration message to the UE 200.

For example, the base station 100B (information obtaining unit 141) obtains the RRC Reconfiguration message. The base station 100B (second communication processing unit 145) transmits a Handover Request Acknowledge message including the RRC Reconfiguration message to the base station 100A.

For example, the base station 100A (second communication processing unit 145) receives the Handover Request Acknowledge message including the RRC Reconfiguration message. The base station 100A (information obtaining unit 141) obtains the RRC Reconfiguration message. The base station 100A (first communication processing unit 143) transmits the RRC Reconfiguration message to the UE 200.

(2) UE with Limited Bandwidth Capability

Description for the UE with a limited bandwidth capability is the same as the description in the first embodiment. Thus, duplicate description is omitted here.

(3) CORESET

For example, each of the first CORESET and the second CORESET is a CORESET for a Type0-PDCCH CSS set. In other words, each of the first CORESET and the second CORESET is a CORESET #0. In each of the first CORESET and the second CORESET, a PDCCH for a SIB1 is located.

This, for example, enables the UE 200 to use a CORESET #0 with a bandwidth suitable for the UE 200 in a target cell to receive a PDCCH for a SIB1 and receive the SIB1.

(4) CORESET Information

Content of CORESET Information

For example, the first CORESET information indicates a bandwidth of the first CORESET, and the second CORESET information indicates a bandwidth of the second CORESET. This, for example, enables a normal UE and a UE with a limited bandwidth capability to use CORESET #0 different from each other.

For example, the bandwidth of the first CORESET is one of 24 RBs, 48 RBs, and 96 RBs. For example, the bandwidth of the second CORESET is one of two or more predetermined bandwidths.

For example, the two or more predetermined bandwidths include a predetermined bandwidth narrower than 24 RBs. This, for example, enables a UE with a limited bandwidth capability to use the CORESET even in a case where the UE is only capable of communicating over a bandwidth narrower than 24 RBs.

The two or more predetermined bandwidths may include only predetermined bandwidths narrower than 24 RBs. Alternatively, the two or more predetermined bandwidths may include at least one predetermined bandwidth narrower than 24 RBs and at least one predetermined bandwidth equal to or wider than 24 RBs.

Note that the two or more predetermined bandwidths are not limited to the above examples. The two or more predetermined bandwidths may include no predetermined bandwidths narrower than 24 RBs. Even in this case, a normal UE and a UE with a limited bandwidth capability can use CORESET #0 different from each other in a target cell.

For example, the first CORESET information is first controlResourceSetZero, and the second CORESET information is second controlResourceSetZero. Such controlResourceSetZero indicates not only a bandwidth of a CORESET (that is, the number of RBs), but also a multiplexing pattern, the number of symbols, and an RB offset of the CORESET. This, for example, enables a normal UE and a UE with a limited capability to use CORESET #0 different in various aspects from each other in a target cell.

Operations Based on CORESET Information

As described above, for example, the UE 200 (information obtaining unit 231) obtains the first CORESET information or the second CORESET information included in the RRC Reconfiguration message. For example, in a case where the UE 200 is a UE with a limited bandwidth capability, the UE 200 (communication processing unit 233) identifies the second CORESET in the target cell on the basis of the second CORESET information, and receives a PDCCH for a SIB1 using the second CORESET. The UE 200 (communication processing unit 233) receives the SIB1 on the basis of DCI transmitted on the PDCCH.

(5) RRC Reconfiguration Message

For example, the RRC Reconfiguration message includes, in BWP-DownlinkCommon, first pdcch-configCommon and second pdcch-configCommon for a UE with a limited bandwidth capability. The first pdcch-configCommon includes the first CORESET information (that is, first controlResourceSetZero). The second pdcch-configCommon includes the second CORESET information (that is, second controlResourceSetZero).

Alternatively, the RRC Reconfiguration message may include, in pdcch-configCommon included in BWP-DownlinkCommon, the first CORESET information and the second CORESET information.

Note that, in the second embodiment, the location of the first CORESET information and the second CORESET information in the RRC Reconfiguration message is not limited to the examples.

(6) Process Flow

An example of a part of a handover process according to the second embodiment will be described with reference to FIG. 12.

The UE 200 transmits a Measurement Report message to the base station 100A (S410).

The base station 100A makes a handover decision (S420).

The base station 100A transmits a Handover Request message to the base station 100B (S430). The base station 100B receives the Handover Request message.

The base station 100B performs admission control (S440).

The base station 100B transmits a Handover Request Acknowledge message including an RRC Reconfiguration message to the base station 100A (S450). The base station 100A receives the Handover Request Acknowledge message.

The RRC Reconfiguration message includes first CORESET information regarding a first CORESET in a target cell, and second CORESET information regarding a second CORESET for a UE with a limited bandwidth capability in the target cell.

The base station 100A obtains the RRC Reconfiguration message and transmits the RRC Reconfiguration message to the UE 200 (S460). The UE 200 receives the RRC Reconfiguration message and obtains the first CORESET information or the second CORESET information.

5.2. Modification Examples

In the example described in the second embodiment, the handover is a handover between two base stations 100. However, the handover according to the second embodiment is not limited to this example.

As a modification example of the second embodiment, the handover may be a handover between two cells of the same base station 100 (for example, base station 100A). In this case, the above-described base station 100B may not operate in the handover, and only the base station 100A and the UE 200 may operate. The base station 100A may generate the RRC Reconfiguration message.

6. Modification Examples

In the above-described examples of embodiments of the present disclosure, the system 1 is a system compliant with 5G or NR TSs. However, the system 1 according to embodiments of the present disclosure is not limited to this example.

The system 1 may be a system compliant with other 3GPP TSs. As an example, the system 1 may be a system compliant with TSs of Long Term Evolution (LTE), LTE Advanced (LTE-A), or 4G, and the base station 100 may be an evolved Node B (eNB). As another example, the system 1 may be a system compliant with TSs of 3G, and the base station 100 may be a Node B. As yet another example, the system 1 may be a system compliant with TSs of next-generation (for example, 6G.

Alternatively, the system 1 may be a system compliant with TSs of another standardization organization for mobile communications.

While embodiments of the present disclosure have been described above, the present disclosure is not limited to the embodiments. It will be understood by those skilled in the art that the embodiments are merely examples and various changes can be made without departing from the scope and the spirit of the present disclosure.

For example, steps in a process described in the present specification are not necessarily executed chronologically in the order described in the flowchart or sequence diagram. For example, steps in a process may be executed in an order different from the order described as the flowchart or sequence diagram, or may be executed in parallel. In addition, one or more steps in a process may be removed, or one or more further steps may be added to the process.

For example, there may be provided a method including the operations of one or more components of an apparatus described in the present specification, and there may be provided a program for causing a computer to execute the operations of the components. Moreover, there may be provided a non-transitory tangible computer-readable storage medium having stored therein the program. Naturally, such a method, program, and non-transitory tangible computer-readable storage medium are also included in the present disclosure.

For example, in the present disclosure, a user equipment (UE) may be referred to by another name such as mobile station, mobile terminal, mobile device, mobile unit, subscriber station, subscriber terminal, subscriber device, subscriber unit, wireless station, wireless terminal, wireless device, wireless unit, remote station, remote terminal, remote device, or remote unit.

For example, in the present disclosure, "transmit" may mean to perform processing of at least one layer in a protocol stack used for transmission, or to physically transmit signals wirelessly or by wire. Alternatively, "transmit" may mean a combination of performing processing of the at least one layer and physically transmitting signals wirelessly or by wire. Similarly, "receive" may mean to perform processing of at least one layer in a protocol stack used for reception, or to physically receive signals wirelessly or by wire. Alternatively, "receive" may mean a combination of performing processing of the at least one layer and physically receiving signals wirelessly or by wire.

For example, in the present disclosure, "obtain/acquire" may mean to obtain/acquire information from stored information, to obtain/acquire information from information received from another node, or to obtain/acquire information by generating the information.

For example, in the present disclosure, "include" and "comprise" do not mean that only listed items are included but mean that only listed items may be included or a further item as well as the listed items may be included.

For example, in the present disclosure, "or" does not mean exclusive OR but means inclusive OR.

Note that the technical features included in the above embodiments may be represented as the following features. Naturally, the present disclosure is not limited to the following features.

(Feature 1)

A base station (100) comprising:

an information obtaining unit (141) configured to obtain a Master Information Block, MIB; and a communication processing unit (143) configured to transmit the MIB, wherein the MIB includes 1-bit information regarding a bandwidth of a Control Resource Set, CORESET, for a user equipment with a limited bandwidth capability.

(Feature 2)

The base station according to Feature 1, wherein the 1-bit information is information indicating whether an additional MIB including CORESET information indicative of the bandwidth of the CORESET is transmitted.

(Feature 3)

The base station according to Feature 2, wherein the additional MIB is a MIB for a user equipment with a limited bandwidth capability.

(Feature 4)

The base station according to Feature 2 or 3, wherein the information obtaining unit is configured to obtain the additional MIB, and the communication processing unit is configured to transmit the additional MIB.

(Feature 5)

The base station according to Feature 4, wherein the communication processing unit is configured to transmit the MIB on a Physical Broadcast Channel, PBCH, and transmit the additional MIB on a further physical channel.

(Feature 6)

The base station according to Feature 5, wherein the further physical channel is located in a frequency resource determined depending on a frequency resource in which the PBCH is located.

(Feature 7)

The base station according to Feature 6, wherein the further physical channel is located in one or more predetermined Resource Blocks, RBs, among a plurality of RBs in which the PBCH is located.

(Feature 8)

The base station according to Feature 1, wherein the 1-bit information is CORESET information indicative of the bandwidth of the CORESET.

(Feature 9)

The base station according to Feature 8, wherein the 1-bit information further indicates at least one of a multiplexing pattern, a number of symbols, and a resource block offset of the CORESET.

(Feature 10)

The base station according to any one of Features 2 to 9, wherein the CORESET information indicates one of two or more predetermined bandwidths as the bandwidth of the CORESET, and the two or more predetermined bandwidths include a predetermined bandwidth that is narrower than 24 Resource Blocks, RBs.

(Feature 11)

The base station according to any one of Features 1 to 10, wherein the MIB further includes 4-bit information regarding a further CORESET, and the 4-bit information indicates 24 RBs, 48 RBs, or 96 RBs as a bandwidth of the further CORESET.

(Feature 12)

The base station according to any one of Features 1 to 11, wherein the CORESET is a CORESET for a Type 0 Physical Downlink Control Channel, PDCCH, Common Search Space, CSS, set.

(Feature 13)

A user equipment (200) comprising:

a communication processing unit (243) configured to receive a Master Information Block, MIB, that includes 1-bit information regarding a bandwidth of a Control Resource Set, CORESET, for a user equipment with a limited bandwidth capability; and an information obtaining unit (241) configured to obtain the 1-bit information included in the MIB.

(Feature 14)

A base station (100) comprising:

an information obtaining unit (141) configured to obtain a Radio Resource Control, RRC, Reconfiguration message for a handover of a user equipment (200) from a source cell to a target cell; and a communication processing unit (143) configured to transmit the RRC Reconfiguration message to the user equipment, wherein the RRC Reconfiguration message includes first Control Resource Set, CORESET, information regarding a first CORESET in the target cell, and second CORESET information regarding a second CORESET for a user equipment with a limited bandwidth capability in the target cell.

(Feature 15)

The base station according to Feature 14, wherein the first CORESET information indicates a bandwidth of the first CORESET, and the second CORESET information indicates a bandwidth of the second CORESET.

(Feature 16)

The base station according to Feature 15, wherein the bandwidth of the first CORESET is one of 24 Resource Blocks, RBs, 48 RBs, and 96 RBs, the bandwidth of the second CORESET is one of two or more predetermined bandwidths, and the two or more predetermined bandwidths include a predetermined bandwidth that is narrower than 24 RBs.

(Feature 17)

The base station according to any one of Features 14 to 16, wherein the first CORESET information is first controlResourceSetZero, and the second CORESET information is second controlResourceSetZero.

(Feature 18)

The base station according to any one of Features 14 to 17, wherein each of the first CORESET and the second CORESET is a CORESET for a Type 0 Physical Downlink Control Channel, PDCCH, Common Search Space, CSS, set.

(Feature 19)

A user equipment (200) comprising:

a communication processing unit (243) configured to receive, from a base station (100), a Radio Resource Control, RRC, Reconfiguration message for a handover of the user equipment from a source cell to a target cell, the RRC Reconfiguration message including first Control Resource Set, CORESET, information regarding a first CORESET in the target cell, and second CORESET information regarding a second CORESET for a user equipment with a limited bandwidth capability in the target cell; and an information obtaining unit (241) configured to obtain the first CORESET information or the second CORESET information.

(Feature 20)

A base station (100B) comprising:

an information obtaining unit (141) configured to obtain a Radio Resource Control, RRC, Reconfiguration message for a handover of a user equipment (200) from a source cell to a target cell; and a communication processing unit (145) configured to transmit, to a base station (100A) of the source cell, a Handover Request Acknowledge message including the RRC Reconfiguration message, wherein the RRC Reconfiguration message includes first Control Resource Set, CORESET, information regarding a first CORESET in the target cell, and second CORESET information regarding a second CORESET for a user equipment with a limited bandwidth capability in the target cell.

(Feature 21)

A method performed by a base station (100), comprising:

obtaining a Master Information Block, MIB; and transmitting the MIB, wherein the MIB includes 1-bit information regarding a bandwidth of a Control Resource Set, CORESET, for a user equipment with a limited bandwidth capability.

(Feature 22)

A method performed by a user equipment (200), comprising:

receiving a Master Information Block, MIB, that includes 1-bit information regarding a bandwidth of a Control Resource Set, CORESET, for a user equipment with a limited bandwidth capability; and obtaining the 1-bit information included in the MIB.

(Feature 23)

A method performed by a base station (100), comprising:

obtaining a Radio Resource Control, RRC, Reconfiguration message for a handover of a user equipment (200) from a source cell to a target cell; and transmitting the RRC Reconfiguration message to the user equipment, wherein the RRC Reconfiguration message includes first Control Resource Set, CORESET, information regarding a first CORESET in the target cell, and second CORESET information regarding a second CORESET for a user equipment with a limited bandwidth capability in the target cell.

(Feature 24)

A method performed by a user equipment (200), comprising:

receiving, from a base station (100), a Radio Resource Control, RRC, Reconfiguration message for a handover of the user equipment from a source cell to a target cell, the RRC Reconfiguration message including first Control Resource Set, CORESET, information regarding a first CORESET in the target cell, and second CORESET information regarding a second CORESET for a user equipment with a limited bandwidth capability in the target cell, obtaining the first CORESET information or the second CORESET information.

(Feature 25)

A method performed by a base station (100B), comprising:

obtaining a Radio Resource Control, RRC, Reconfiguration message for a handover of a user equipment (200) from a source cell to a target cell; and transmitting, to a base station (100A) of the source cell, a Handover Request Acknowledge message including the RRC Reconfiguration message, wherein the RRC Reconfiguration message includes first Control Resource Set, CORESET, information regarding a first CORESET in the target cell, and second CORESET information regarding a second CORESET for a user equipment with a limited bandwidth capability in the target cell.

(Feature 26)

A program for causing a computer to execute:

obtaining a Master Information Block, MIB; and transmitting the MIB, wherein the MIB includes 1-bit information regarding a bandwidth of a Control Resource Set, CORESET, for a user equipment with a limited bandwidth capability.

(Feature 27)

A program for causing a computer to execute:

receiving a Master Information Block, MIB, that includes 1-bit information regarding a bandwidth of a Control Resource Set, CORESET, for a user equipment with a limited bandwidth capability; and obtaining the 1-bit information included in the MIB.

(Feature 28)

A program for causing a computer to execute:

obtaining a Radio Resource Control, RRC, Reconfiguration message for a handover of a user equipment (200) from a source cell to a target cell; and transmitting the RRC Reconfiguration message to the user equipment, wherein the RRC Reconfiguration message includes first Control Resource Set, CORESET, information regarding a first CORESET in the target cell, and second CORESET information regarding a second CORESET for a user equipment with a limited bandwidth capability in the target cell.

(Feature 29)

A program for causing a computer to execute:

receiving, from a base station (100), a Radio Resource Control, RRC, Reconfiguration message for a handover of a user equipment (200) from a source cell to a target cell, the RRC Reconfiguration message including first Control Resource Set, CORESET, information regarding a first CORESET in the target cell, and second CORESET information regarding a second CORESET for a user equipment with a limited bandwidth capability in the target cell; and obtaining the first CORESET information or the second CORESET information.

(Feature 30)

A program for causing a computer to execute:

obtaining a Radio Resource Control, RRC, Reconfiguration message for a handover of a user equipment (200) from a source cell to a target cell; and transmitting, to a base station (100A) of the source cell, a Handover Request Acknowledge message including the RRC Reconfiguration message, wherein the RRC Reconfiguration message includes first Control Resource Set, CORESET, information regarding a first CORESET in the target cell, and second CORESET information regarding a second CORESET for a user equipment with a limited bandwidth capability in the target cell.

(Feature 31)

A non-transitory tangible computer-readable storage medium having stored therein a program for causing a computer to execute:

obtaining a Master Information Block, MIB; and transmitting the MIB, wherein the MIB includes 1-bit information regarding a bandwidth of a Control Resource Set, CORESET, for a user equipment with a limited bandwidth capability.

(Feature 32)

A non-transitory tangible computer-readable storage medium having stored therein a program for causing a computer to execute:

receiving a Master Information Block, MIB, that includes 1-bit information regarding a bandwidth of a Control Resource Set, CORESET, for a user equipment with a limited bandwidth capability; and obtaining the 1-bit information included in the MIB.

(Feature 33)

A non-transitory tangible computer-readable storage medium having stored therein a program for causing a computer to execute:

obtaining a Radio Resource Control, RRC, Reconfiguration message for a handover of a user equipment (200) from a source cell to a target cell; and transmitting the RRC Reconfiguration message to the user equipment, wherein the RRC Reconfiguration message includes first Control Resource Set, CORESET, information regarding a first CORESET in the target cell, and second CORESET information regarding a second CORESET for a user equipment with a limited bandwidth capability in the target cell.

(Feature 34)

A non-transitory tangible computer-readable storage medium having stored therein a program for causing a computer to execute:

receiving, from a base station (100), a Radio Resource Control, RRC, Reconfiguration message for a handover of a user equipment (200) from a source cell to a target cell, the RRC Reconfiguration message including first Control Resource Set, CORESET, information regarding a first CORESET in the target cell, and second CORESET information regarding a second CORESET for a user equipment with a limited bandwidth capability in the target cell; and obtaining the first CORESET information or the second CORESET information.

(Feature 35)

A non-transitory tangible computer-readable storage medium having stored therein a program for causing a computer to execute:

obtaining a Radio Resource Control, RRC, Reconfiguration message for a handover of a user equipment (200) from a source cell to a target cell; and transmitting, to a base station (100A) of the source cell, a Handover Request Acknowledge message including the RRC Reconfiguration message, wherein the RRC Reconfiguration message includes first Control Resource Set, CORESET, information regarding a first CORESET in the target cell, and second CORESET information regarding a second CORESET for a user equipment with a limited bandwidth capability in the target cell.

What is claimed is:

1. A user equipment comprising:

a memory storing a program; and one or more processors configured to execute the program to:

receive, from a base station, a Radio Resource Control (RRC) Reconfiguration message for indicating a handover from a source cell to a target cell, wherein the RRC Reconfiguration message includes first information for indicating a number of resource blocks and a number of symbols of a Control Resource Set #0 (CORESET #0) for a Type-0 Physical Downlink Control Channel (PDCCH) common search space set in the target cell, and second information for indicating a number of resource blocks and a number of symbols of a CORESET #0 for a Type-0 PDCCH common search space set for a Reduced Capability (RedCap) user equipment in the target cell, use the first information or the second information, and acquire, from the target cell, a System Information Block 1 (SIB1) based on downlink control information on the CORESET #0 for the Type-0 PDCCH common search space set for the RedCap user equipment in a case where the user equipment is the RedCap user equipment.

2. The user equipment according to claim 1, wherein:

the first information indicates a multiplexing pattern of a first CORESET, and the second information indicates a multiplexing pattern of a second CORESET.

3. A base station comprising:

a memory storing a program; and one or more processors configured to execute the program to:

transmit, to a user equipment, a Radio Resource Control (RRC) Reconfiguration message for indicating a handover from a source cell to a target cell wherein the RRC Reconfiguration message includes first information for indicating a number of resource blocks and a number of symbols of a Control Resource Set #0 (CORESET #0) for a Type-0 Physical Downlink Control Channel (PDCCH) common search space set in the target cell, and second information for indicating a number of resource blocks and a number of symbols of a CORESET #0 for a Type-0 PDCCH common search space set for a Reduced Capability (RedCap) user equipment in the target cell, wherein:

the second information is information to be used by the user equipment to acquire, from the target cell, a System Information Block 1 (SIB1) based on downlink control information on the CORESET #0 for the Type-0 PDCCH common search space set for the RedCap user equipment in a case where the user equipment is the RedCap user equipment.

4. A method performed by a user equipment comprising:

receiving, from a base station, a Radio Resource Control (RRC) Reconfiguration message for indicating a handover from a source cell to a target cell, wherein the RRC Reconfiguration message includes first information for indicating a number of resource blocks and a number of symbols of a Control Resource Set #0 (CORESET #0) for a Type-0 Physical Downlink Control Channel (PDCCH) common search space set in the target cell, and second information for indicating a number of resource blocks and a number of symbols of a CORESET #0 for a Type-0 PDCCH common search space set for a Reduced Capability (RedCap) user equipment in the target cell, using the first information or the second information, and acquiring, from the target cell, a System Information Block 1 (SIB1) based on downlink control information on the CORESET #0 for the Type-0 PDCCH common search space set for the RedCap user equipment in a case where the user equipment is the RedCap user equipment.

5. The user equipment according to claim 4, wherein:

the first information indicates a multiplexing pattern of a first CORESET, and the second information indicates a multiplexing pattern of second CORESET.

* * * * *